US012705564B2

(12) United States Patent
Dubey et al.

(10) Patent No.: US 12,705,564 B2
(45) Date of Patent: Aug. 11, 2026

(54) CONTAINER PACK SIZE OPTIMIZATION

(71) Applicant: Walmart Apollo, LLC, Bentonville, AR (US)

(72) Inventors: Pallav S. Dubey, Bangalore (IN); Mohit Mehrotra, Jabalpur (IN); Deepa Radhakrishnan, Bangalore (IN); Harshitha Sampangi, Bangalore (IN); Kyle R. Carlyle, Cave Springs, AR (US); Anuradha Chithirala, Bentonville, AR (US); Adriano De Brito Caraco, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 427 days.

(21) Appl. No.: 18/234,144

(22) Filed: Aug. 15, 2023

(65) Prior Publication Data

US 2023/0385976 A1 Nov. 30, 2023

Related U.S. Application Data

(63) Continuation of application No. 16/711,854, filed on Dec. 12, 2019, now Pat. No. 11,727,521.
(Continued)

(30) Foreign Application Priority Data

Dec. 12, 2018 (IN) ............................. 201841046952

(51) Int. Cl.
*G06Q 10/08* (2024.01)
*B65B 59/00* (2006.01)
(Continued)

(52) U.S. Cl.
CPC ........... *G06Q 10/08* (2013.01); *B65B 59/003* (2019.05); *G06Q 10/06315* (2013.01); *G06Q 10/083* (2013.01); *G06Q 10/087* (2013.01)

(58) Field of Classification Search
CPC ............. G06Q 10/08; G06Q 10/06315; G06Q 10/083; G06Q 10/087; B65B 59/003
See application file for complete search history.

(56) References Cited

U.S. PATENT DOCUMENTS 7,366,643 B2 4/2008 Verdura
7,873,549 B1 1/2011 Mishra
(Continued)

OTHER PUBLICATIONS

T. Bartkowiak and p. Pawlewski, "Reducing negative impact of machine failures on performance of filling and packaging production line—a simulative study," 2016 Winter Simulation Conference (WSC), Washington, DC, USA, 2016, pp. 2912-2923, doi: 10.1109/WSC.2016.7822326. (Year: 2016).*
(Continued)

*Primary Examiner* — George Chen
*Assistant Examiner* — Tayar M Kyu
(74) *Attorney, Agent, or Firm* — Fitch, Even, Tabin & Flannery LLP

(57) ABSTRACT

A control circuit obtains a first set of rules that define a conveyability range for containers as a function of conveyability constraints pertaining to an intermediary distribution facility. The control circuit also accesses conveyability constraint information for the intermediary distribution facility and generates a conveyability range for that facility by evaluating the constraint information against the first set of rules. The control circuit obtains a second set of rules that define an objective function that uses the conveyability range as a constraint to determine an optimal container pack size for the given item. (By one approach these teachings will also accommodate using at least two additional con-
(Continued)

straints, such as a so-called days-of-supply (DOS) constraint and a so-called pack-and-a-half constraint.) The control circuit then generates an optimal container pack size for the given item by evaluating the objective function against the conveyability range (and other selected constraints).

10 Claims, 6 Drawing Sheets

Related U.S. Application Data

(60) Provisional application No. 62/803,957, filed on Feb. 11, 2019.

(51) Int. Cl.
*G06Q 10/0631* (2023.01)
*G06Q 10/083* (2024.01)
*G06Q 10/087* (2023.01)

(56) References Cited

U.S. PATENT DOCUMENTS 8,401,975 B1 * 3/2013 Tian ........................ G06Q 10/08 705/332
8,560,406 B1 10/2013 Antony
9,098,822 B1 8/2015 Doshi
9,230,233 B1 1/2016 Sundaresan
9,315,344 B1 4/2016 Lehmann
9,464,885 B2 10/2016 Lloyd
9,914,278 B2 3/2018 Pettersson
11,727,521 B2 8/2023 Dubey
2008/0020916 A1 1/2008 Magnell
2013/0247519 A1 * 9/2013 Clark ...................... B65B 59/02 53/452
2015/0334325 A1 11/2015 Saporetti
2017/0206480 A1 7/2017 Naumann
2018/0130015 A1 5/2018 Jones
2018/0224837 A1 * 8/2018 Enssle ................ G06Q 10/0875
2020/0193547 A1 6/2020 Dubey

OTHER PUBLICATIONS

USPTO—U.S. Appl. No. 16/711,854; Office Action mailed Jun. 23, 2021; (pp. 1-19).
USPTO; U.S. Appl. No. 16/711,854; Office Action mailed Oct. 7, 2021; (pp. 1-9).
USPTO; U.S. Appl. No. 16/711,854; Final Rejection mailed Aug. 30, 2022; (pp. 1-10).
USPTO; U.S. Appl. No. 16/711,854; Non-Final Rejection mailed Apr. 5, 2022; (pp. 1-9).
USPTO; U.S. Appl. No. 16/711,854; Non-Final Rejection mailed Dec. 21, 2022; (pp. 1-11).
USPTO; U.S. Appl. No. 16/711,854; Notice of Allowance and Fees Due (PTOL-85) mailed Mar. 27, 2023; (pp. 1-8).

* cited by examiner

CONTAINER PACK SIZE OPTIMIZATION

CROSS-REFERENCE TO RELATED APPLICATIONS

This application claims the benefit of Indian Application Number 201841046952, filed Dec. 12, 2018, and U.S. Provisional Application No. 62/803,957, filed Feb. 11, 2019, which are incorporated herein by reference in their entirety. This application is a continuation of U.S. application Ser. No. 16/711,854 filed Dec. 12, 2019, which is incorporated herein by reference in its entirety.

TECHNICAL FIELD

These teachings relate generally to containers, such as cardboard boxes, utilized to ship a plurality of like items to and/or through an intermediary distribution facility.

BACKGROUND

Intermediary distribution facilities are a common fixture in a modern supply chain. As used herein the expression "distribution facility" will be understood to refer to a physical facility (such as one or more buildings) where items are received post-manufacture and then further distributed to one or more downstream stores. A distribution center is not itself a shopping facility and instead serves as part of the supply chain that supplies stores with products to be sold at retail. A distribution facility can serve as a warehouse by temporarily storing received items pending the distribution of such items to downstream stores but in many cases, items will not be warehoused in a traditional sense and will instead be moved from a receiving area to a dispersal area to minimize the time during which the distribution facility possesses such items.

In many cases, items are received at an intermediate distribution facility in bulk and contained within a corresponding container (i.e., a shipping container, sometimes referred to in the art as a pack container or a case-pack). Such containers are often comprised of cardboard or the like though other materials are sometimes employed. This container is not to be confused with the packaging for the individual items at the stock keeping unit (SKU) level, which packaging is typically designed and intended for retail display and to be opened by the ultimate consumer. Depending upon the size of the items and their packaging as well as the respective size of the corresponding container, a given container may contain any number of such items.

Modern distribution facilities often include mechanisms, such as conveyor belts, to move such containers from one place to another. These conveyance systems can be relatively simple or relatively complex and multifaceted as desired.

Generally speaking, there are internal costs associated with container pack sizes (where the expression "container pack size" refers to the number of individual SKU-level packages for a given item that can be contained in a particular container). Examples include holding costs for holding the container at the intermediary distribution facility, intermediary distribution facility handling costs, and downstream store handling costs. There exists no one perfectly-sized container that represents a minimum cost for all handled items.

BRIEF DESCRIPTION OF THE DRAWINGS

The above needs are at least partially met through provision of the container pack size optimization apparatus and method described in the following detailed description, particularly when studied in conjunction with the drawings, wherein.

Figure 1:
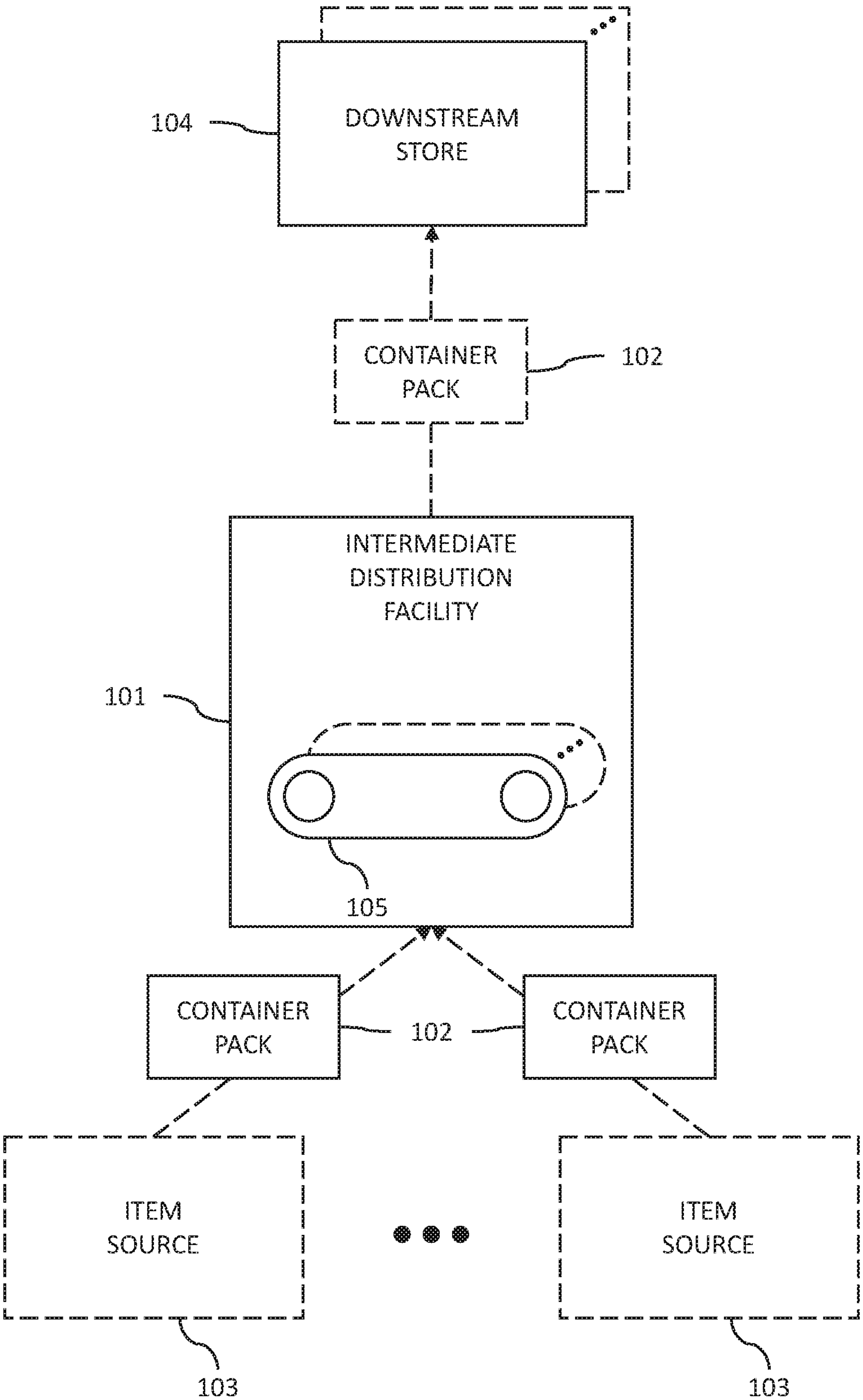
FIG. 1 comprises a block diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated.

DETAILED DESCRIPTION

Generally speaking, pursuant to these various embodiments an optimal container pack size can be determined for a given item for shipping to an intermediary distribution facility. By one approach a control circuit obtains a first set of rules that define a conveyability range for containers as a function of conveyability constraints pertaining to the intermediary distribution facility. The control circuit then accesses conveyability constraint information for the intermediary distribution facility and generates a conveyability range for that intermediary distribution facility by evaluating the constraint information against the first set of rules. The control circuit then obtains a second set of rules that defines an objective function that uses the conveyability range as a constraint to determine an optimal container pack size for the given item. (By one approach these teachings will also accommodate using at least two additional constraints, such as a so-called days-of-supply (DOS) constraint and a so-called pack-and-a-half constraint.) The control circuit then generates an optimal container pack size for the given item by evaluating the objective function against the conveyability range (and other selected constraints).

By one approach the aforementioned conveyability range defines spatial and/or weight limits for containers. By one approach, a distance-measuring probe automatically measures distances for physical constraints that correspond to at least one conveyor line in the intermediate distribution facility. So, configured, the aforementioned conveyability constraint information can include constraint information that is based upon the aforementioned automatically measured distance for the physical constraints that correspond to the at least one conveyor line.

The aforementioned objective function can be configured to optimize the container pack size for the given item as a function of cost. Examples in these regards include holding costs (at the intermediary distribution facility), intermediary distribution facility handling costs, and downstream store handling costs.

So configured, a container pack size can be determined for a particular item that is both optimized with respect to various associated costs and that is physically realistic in terms of handling capabilities of the conveyance systems of the intermediary distribution facility. Such a determination will typically only need conducting on an occasional basis. Triggering circumstances can include but are not limited to changes to any aspect of the conveyance systems of the corresponding intermediary distribution facility, changes to one or more corresponding downstream stores, and/or changes to available container form factors and/or materials or changes to the items or their packaging.

These and other benefits may become clearer upon making a thorough review and study of the following detailed description. Referring now to the drawings, and in particular to FIG. 1, it may be helpful to first briefly describe a relevant application setting 100 for these teachings.

In this example the application setting 100 includes an intermediate distribution facility 101. These teachings will readily accommodate a plurality of intermediate distribution facilities, but for the sake of simplicity and clarity only a single intermediate distribution facility will be presented here.

In this example the intermediate distribution facility 101 includes at least one conveyor line 105. A conveyor line comprises a common piece of mechanical handling equipment that moves items from one location to another. Many varieties of conveyor lines are known including but not limited to systems that employ belts comprised of various kinds of flexible materials, rollers, chains, and so forth. Generally speaking, for purposes of this description it is presumed that the conveyor line 105 is configured and arranged to move containers comprising packing/shipping boxes. These teachings will readily accommodate both simple and complex arrangements of conveyor lines, including straight lines, curved lines, and inclined lines, as well as gates, inspection stations, and routing junctures.

The intermediate distribution facility 101 receives container packs 102 from one or more items sources 103. Generally speaking these items sources 103 will either tend to be the original manufacturer of the item or an intermediary distributor. As one simple example, one item source 103 may be a manufacturer of various health and beauty products while another item source 103 may distribute two brands of automotive tires that are, in turn, manufactured overseas. The container packs 102 will typically comprise cardboard boxes of various sizes and shapes. These teachings will accommodate other materials and/or form factors, if desired. Examples include but are not limited to items that are secured to a pallet, plastic tubs, and bags comprised of plastic or the like.

The intermediate distribution facility 101 intakes these container packs 102. At least some of the container packs 102 are moved via the aforementioned conveyor line(s) 105. Some of the container packs 102 may be moved to an on-site inventory location while others may be moved to an outbound loading dock without first being placed into an inventory area. In either case, eventually at least some of the container packs 102 are shipped from the intermediate distribution facility 101 21 or more downstream stores 104. There, the container packs 102 will typically be opened and the individual items made available for retail sale.

Figure 2:
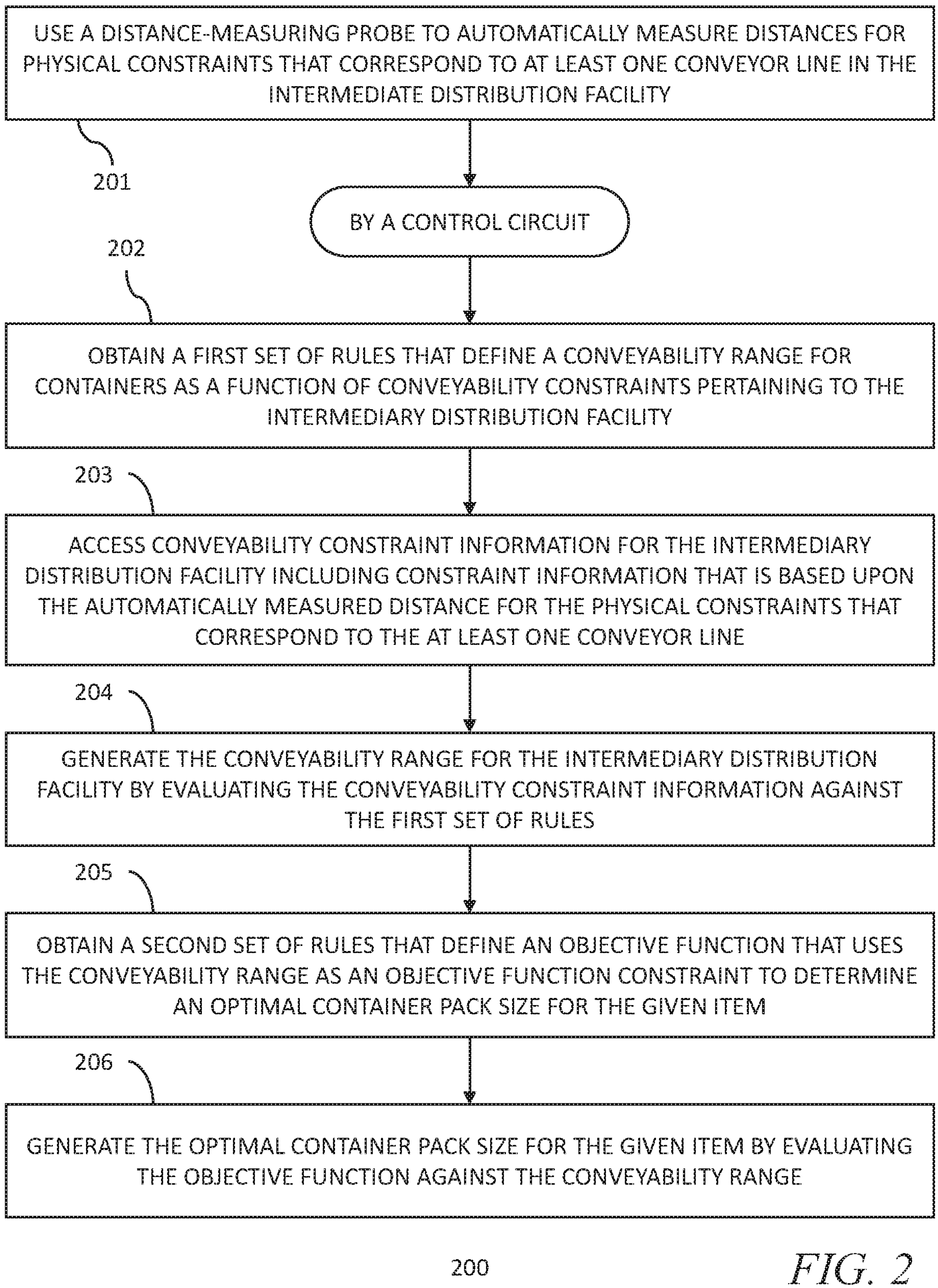
FIG. 2 comprises a flow diagram as configured in accordance with various embodiments of these teachings.

FIG. 2 presents a process 200 that can be beneficially applied with respect to such an application setting 100.

Figure 3:
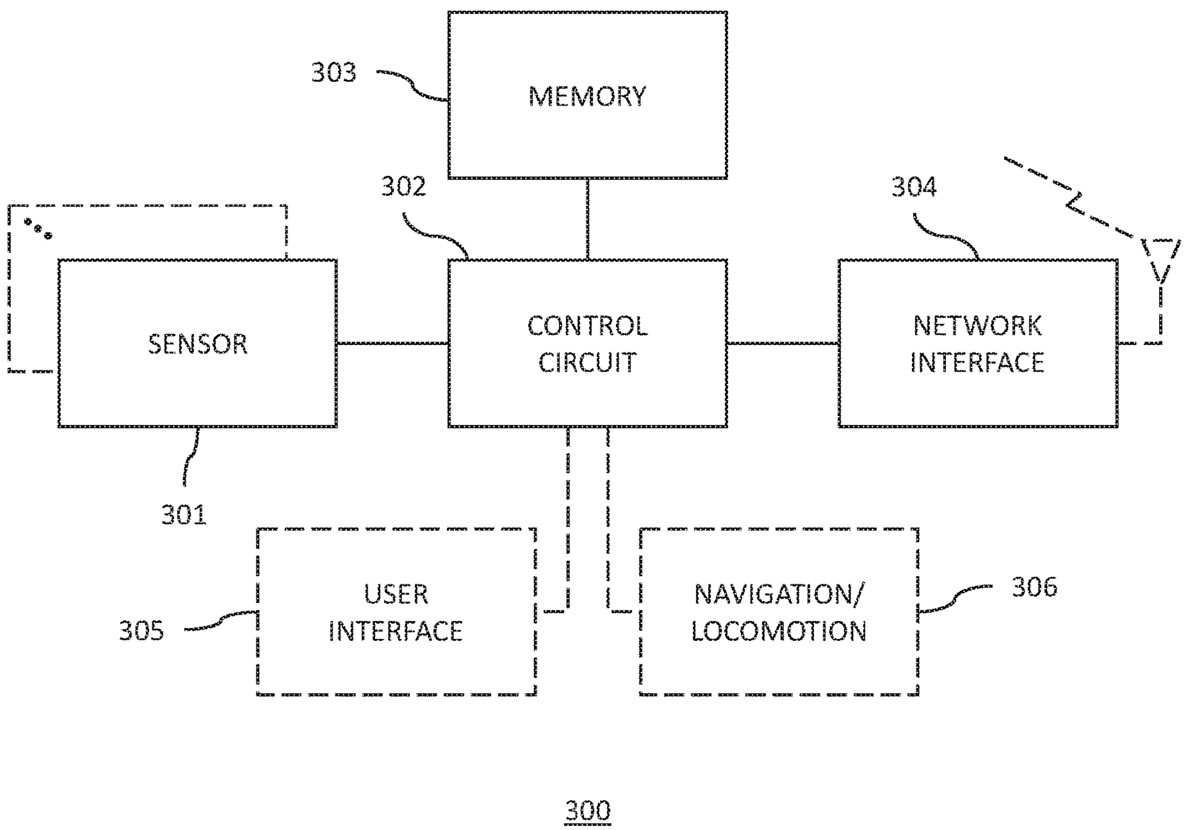
FIG. 3 comprises a block diagram as configured in accordance with various embodiments of these teachings.
Figure 4:
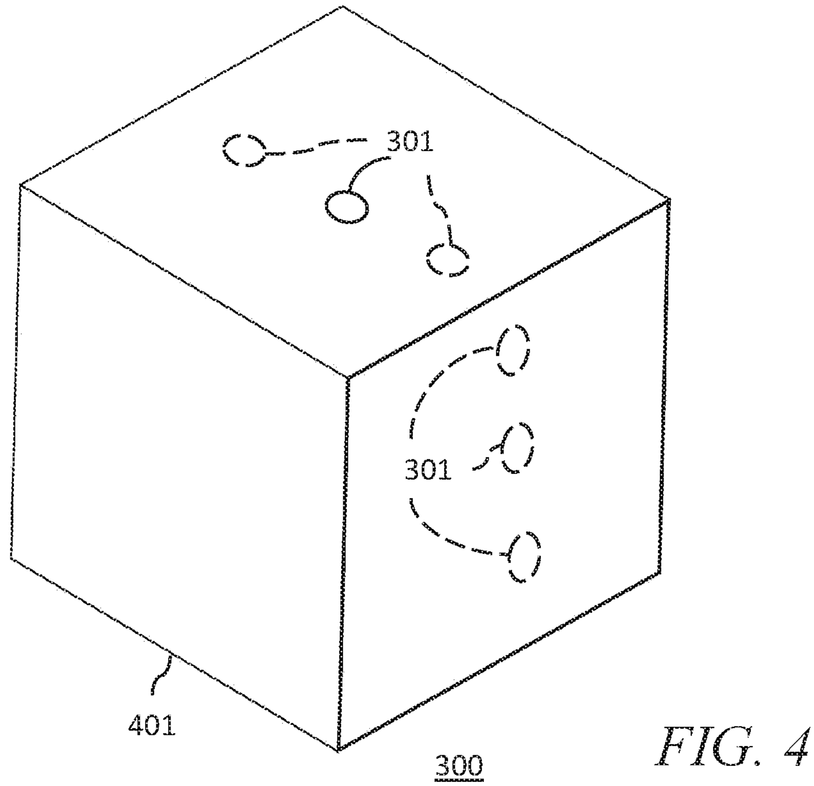
FIG. 4 comprises a block diagram as configured in accordance with various embodiments of these teachings.

Block 201 presents the optional use of a distance-measuring probe to automatically measured distances for physical constraints that correspond to at least one conveyor line 105 in the intermediate distribution facility 101. FIGS. 3 and 4 presents some illustrative examples in these regards.

In this illustrative example the distance-measuring probe 300 includes a housing 401 shaped like a box (in this case, a cube). The housing may be comprised of any suitable material including plastic and/or metal. The distance-measuring probe 300 includes one or more distance-measuring sensors 301. These teachings will accommodate a variety of distance-measuring sensors in loading, but not limited to, ultrasonic-based sensors, light-based sensors, mechanical whiskered sensors, radar, lidar, and so forth. If desired, the included sensors can also include, for example, accelerometers, tilt detectors, and so forth.

The distance-measuring sensors 301 are disposed on/in the housing 401 and face outwardly in order to detect distances between the distance-measuring probe 300 and other objects. In the example shown in FIG. 4, at least one distance-measuring sensor 301 is disposed on the upper surface of the housing 401. Other such sensors can be disposed as desired, such as on the top surface at other locations and/or along one or more side walls of the distance-measuring probe 300. If desired, one or more such sensors 301 can also be disposed on the front-facing side wall and/or on the back-facing side wall of the distance-measuring probe housing 401.

These sensors 301 operably couple to a control circuit 302. Being a "circuit," the control circuit 302 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 302 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 302 is configured (for example, by using corresponding programming as will be well understood by those skilled in the art) to carry out one or more of the steps, actions, and/or functions described herein.

In this example the control circuit 302 operably couples to a memory 303. This memory 303 may be integral to the control circuit 302 or can be physically discrete (in whole or in part) from the control circuit 302 as desired. This memory 303 can also be local with respect to the control circuit 302 (where, for example, both share a common circuit board, chassis, power supply, and/or housing) or can be partially or wholly remote with respect to the control circuit 302 (where, for example, the memory 303 is physically located in another facility, metropolitan area, or even country as compared to the control circuit 302).

This memory 303 can serve, for example, to non-transitorily store the computer instructions that, when executed by the control circuit 302, cause the control circuit 302 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).) This memory 303 can also serve to store raw and/or processed distance information as provided by the above-described distance-measuring sensors 301.

In this example the control circuit 302 also operably couples to a network interface 304. So configured the control circuit 302 can communicate with other via the network interface 304. Network interfaces, including both wireless and non-wireless platforms, are well understood in the art and require no particular elaboration here.

By one optional approach the control circuit 302 operably couples to a user interface 305. This user interface 305 can comprise any of a variety of user-input mechanisms (such as, but not limited to, keyboards and keypads, cursor-control devices, touch-sensitive displays, speech-recognition interfaces, gesture-recognition interfaces, and so forth) and/or user-output mechanisms (such as, but not limited to, visual displays, audio transducers, printers, and so forth) to facilitate receiving information and/or instructions from a user and/or providing information to a user.

By another optional approach, the distance-measuring probe 300 can include a navigation/locomotion component 306 that also operably couples to the control circuit 302. This navigation/locomotion component 306 can be employed when the distance-measuring probe 300 is itself a self-moving apparatus. For example, when the distance-measuring probe 300 constitutes an airborne drone, the navigation/locomotion component 306 can be configured to fly the distance-measuring probe 300 over a conveyor line 105 of interest.

Figure 5:
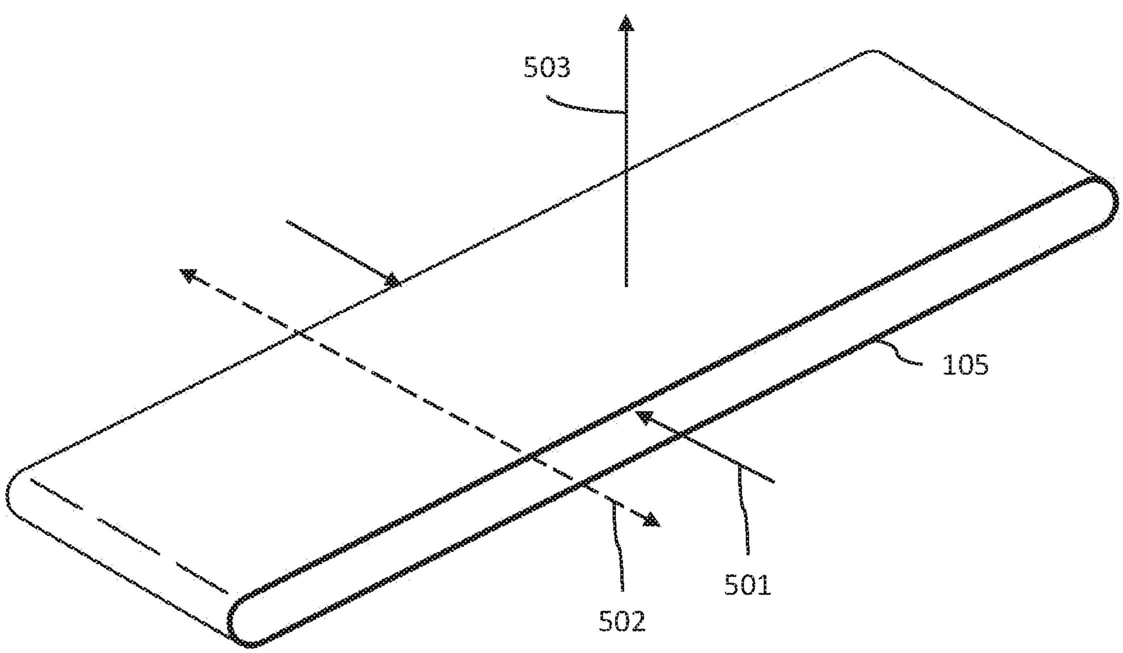
FIG. 5 comprises a schematic representation as configured in accordance with various embodiments of these teachings.

So configured, such a distance-measuring probe 300 can serve to automatically measure one or more distances for physical constraints that correspond to a conveyor line 105 in the intermediate distribution facility 101. In particular, these physical constraints can help define spatial limits that characterize such conveyor lines 105. Referring momentarily to FIG. 5, examples in these regards include, but are not limited to, the width 501 of the conveyor line 105 at one or more points along the length thereof, a lateral (or at least partially lateral) distance 502 out to a closest object that would impact a container pack having a corresponding width that exceeds that lateral distance 502, and a vertical distance 503 up to a closest object that would impact a container pack having a corresponding height that exceeds that vertical distance 503.

Figure 6:
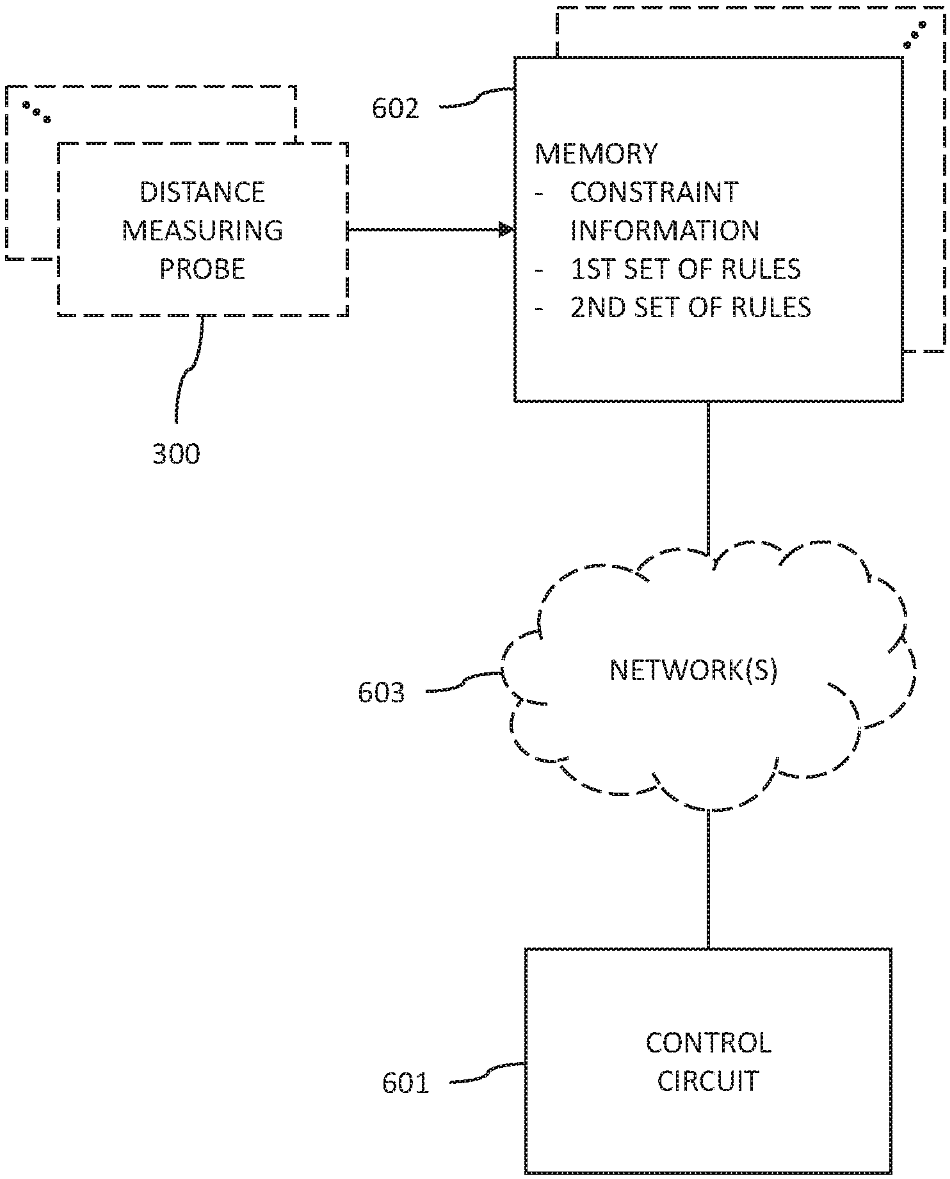
FIG. 6 comprises a block diagram as configured in accordance with various embodiments of these teachings FIG. 7 comprises a data flow diagram as configured in accordance with various embodiments of these teachings.

Referring again to FIG. 2, the remaining actions in this process 200 can be carried out by a control circuit. Referring now as well to FIG. 6, this control circuit 601 can be a "control circuit" as described above. In this example the control circuit 601 operably couples to a memory 602 that itself is comparable to the memory 303 described above. The control circuit 601 can operably couple to this memory 602 via, for example, a direct connection and/or through one or more networks 603 of choice. As will be described in more detail below, the memory 602 can include instructions by which the control circuit 601 carries out this process 200 along with conveyability constraint information, a first set of rules, and a second set of rules.

With continued reference to both FIGS. 2 and 6, at block 202, the control circuit 601 obtains a first set of rules that define a conveyability range for containers as a function of conveyability constraints pertaining to the intermediary distribution facility. This first set of rules can specify that conveyability range as a function of, for example, spatial limits for the containers by, for example, specifying at least one maximum dimension for at least one relevant dimension of container packs 102 in view of the one or more conveyor lines 105 at the intermediate distribution facility 101. Examples in these regards can be a maximum width for the container pack 102 and/or a maximum height for the container pack 102.

By another approach, the conveyability range can define weight limits for such containers. And by yet another approach, the conveyability range can define both spatial limits and weight limits for the containers.

The first set of rules themselves can prescribe, for example, that the maximum width of a container pack 102 cannot exceed the maximum width of the conveyor line 105 at the intermediate distribution facility 101. When there are multiple conveyor lines in play, the first set of rules can specify that the maximum width of the container pack 102 cannot exceed the maximum width of the conveyor line 105 having the smallest lateral dimension. As another example, the first set of rules can prescribe that the maximum width of a container pack 102 cannot exceed the minimum open lateral space available for the one or more conveyor lines 105 at the intermediate distribution facility 101. Other rules can be employed as desired, such as rules that take into account a maximum available vertical open space as regards the one or more conveyor lines 105.

At block 203, the control circuit 601 accesses conveyability constraint information for the intermediary distribution facility 105. This information can constitute or at least comprise constraint information that is based upon automatically measured distance information for the physical constraints as may be obtained through use of a distance-measuring probe 300 as described above. In addition, or in lieu thereof, the accessed conveyability constraint information can constitute information that is otherwise available to the control circuit 601. Examples include manufacturers specifications that correspond to the particular conveyor lines 105 utilized at the intermediate distribution facility 101 and/or actual measurements taken by hand at the facility 101 by an associate utilizing an appropriate measurement.

At block 204 the control circuit 601 then generates a conveyability range for the intermediate distribution facility by evaluating the conveyability constraint information described above against the aforementioned first set of rules. This conveyability range can comprise a maximum dimension for the width of a container pack 102. This conveyability range may also include, for example, a maximum dimension for the height of a container pack 102. By yet another approach, this conveyability range may constitute a maximum dimension that applies to all XYZ dimensions of a container pack 102. These teachings will accommodate other approaches in these regards as desired. (If desired, the conveyability range can also include metrics that correspond to the weight-bearing capacity of the relevant conveyor system.)

At block 205 the control circuit 601 obtains a second set of rules that define an objective function that uses the aforementioned conveyability range as a constraint to determine an optimal container pack size for a given item (presuming that the container pack will contain a corresponding particular number of those items). Objective functions are generally known in the art and typically comprise either a cost function (sometimes referred to as a lost function) or its opposite. A cost function is a function that maps an event or values of one or more variables onto a real number intuitively representing some "cost" associated with the event. An optimization problem seeks to minimize that corresponding cost function.

Pursuant to this process 200, the objective function is configured as desired to optimize a container pack size for a given item as a function of one or more costs. For the sake of a specific example, it is presumed here that the costs of the objective function represent one or more of a holding cost (i.e., of holding the container pack at the intermediate distribution facility 101), and intermediary distribution facility handling cost, and a downstream store handling cost. By one approach the cost can represent a summation of all three of these specifically identified costs. (Those skilled in the art will recognize that the specific value or values of the cost or costs so employed in the objective function will vary with respect to the specifics of the intermediate distribution facility 101, the downstream store or stores 104, and other logistical matters that characterize a particular application setting.)

Accordingly, and as a specific example, the objective function can serve to minimize the three costs identified above by minimizing a total aggregate cost:

$$\text{Minimize TotalCost} = \Sigma HC + HnS + HnD$$

where HC=the hold cost at the distribution facility;
HnS=the store handling cost; and
HnD=the distribution facility handling cost;
and where these costs are calculated on an individual product level for all products expected to move through the supply chain over a given year and then aggregated over all items to yield a single cost result for each category of cost.

As noted above, the second set of rules further define the objective function to utilize the aforementioned conveyability range as an objective function constraint when determining an optimal container pack size for a given item in view of the aforementioned costs. At block 206 the control circuit 601 generates an optimal container pack size for that given item by evaluating the objective function against the conveyability range and in view of the cost constraints. That resultant optimal container pack size is not a universal result that is applicable to any of a wide variety of items. Instead, the resultant optimal container pack size is particular to the specifics of the given item (i.e., such things as the dimensions and/or weight of the given items including their corresponding packaging). Accordingly, this process 200 can be at least partially reprocessed for each of a variety of such items to thereby identify an optimal container pack size for each such item.

As a specific example in these regards, and again without intending to suggest any particular limitations by way of the specificity of this example, the second set of rules can provide for preparing the requisite data in a desired format and then, in conjunction with appropriate input variables, running a for loop for each row of the data. This for loop calculates the recommendations for each item for the different scenarios considered and stores the container pack size along with the costs for each scenario and each item. The operations taking place within this for loop can be defined as follows for a specific illustrative example where a so-called warehouse pack serves as the aforementioned container and a so-called vendor pack serves as a container that contains two or more warehouse packs and that is intended to be broken open upon receipt at a distribution center to enable subsequent handling of the containers/warehouse packs contained therein:

1. In order to calculate the optimal warehouse pack (whpk) and vendor pack (vnpk), the second set of rules can provide for first calculating the optimal whpk size by considering only case pack recommendations (since case pack is often the least expensive option).

2. The range of values for each scenario that can be considered based on the different combinations of the constraints is calculated. For each value in this range the various costs are calculated. Whichever pack size gives the least value is chosen as the optimal pack for that item.

3. If the recommended whpk size is also conveyable (in view of the conveyability constraints) then the vnpk size is chosen to be the same as the whpk size (case pack recommendation), else the recommendation will correspond to a break pack scenario.

By one approach the second set of rules can further provide for the following conditions to be checked for deciding the pack type for an item:

If warehouse pack>Minimum Conveyability Dimensions (and)>Min Weight conveyable then the result is a conveyable case pack (or)

If warehouse pack>Max Conveyability Dimensions (and) >Weight conveyable then the result is a non-conveyable case pack (such items are mostly 1/1 items and bulky items)

(or)

If warehouse pack>Max Conveyability Dimensions (and) <Min Weight conveyable then the result is a Non-Conveyable casepack (or)

If warehouse pack<Min Conveyability Dimensions (and) >Min Weight conveyable then the result is a Break pack.

As noted earlier, the objective function can observe other constraints as well. Two particularly useful constraints are the days-of-supply (DoS) constraint and the pack-and-a-half constraint.

A container size depends on how many days of supply it carries. This metric can be determined by taking the item's sales pattern into consideration. A minimum and maximum threshold for DoS can be defined for each modular department by the corresponding business. When serving as a constraint, the objective function will serve to avoid having the designed pack exceed these thresholds.

The pack-and-a-half constraint, in turn, serves to help ensure that the designed pack does not exceed the allotted shelf capacity for the item at issue. One can calculate the maximum number of units of the item that can be accommodated on the shelf by calculating the minimum shelf capacity for that item across all stores and also the shelf capacity value that is present across at least 85% of the stores. (1.5*whpk size)<=shelf capacity)

Figure 7:
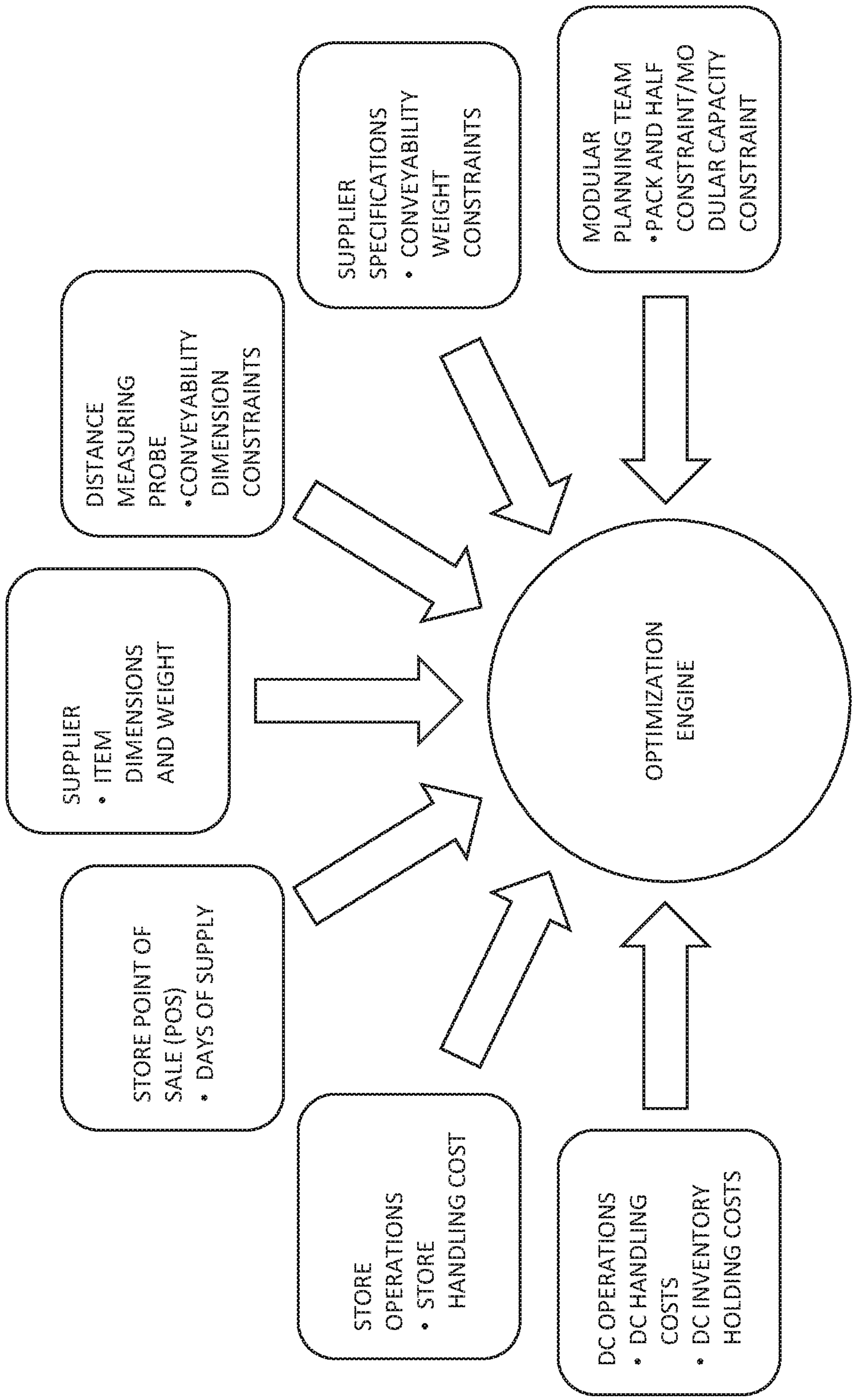

FIG. 7 illustrates an example of the sources/flow of data for the corresponding optimization engine per the following table:

TABLE

| Data Point | Source |
|---|---|
| DC Handling cost | DC Operations |
| DC Inventory Holding cost | DC Operations |
| Store Handling cost | Store Operations |
| Days of Supply Constraint | Store Point of Sale |
| Conveyability Constraint (dimensions) | Distance Measuring probe |
| Conveyability Constraint (Weight) | Manufacturer's specifications |
| Pack and half | Store Modular planning team |
| Item dimensions and weight | Supplier |

So configured and practiced, these teachings facilitate reliably determining optimally-sized container packs for each of a wide variety and number of items that are also practical and usable in specific intended application settings.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method comprising:

providing a distribution facility having at least two conveyor lines, wherein at least one of the at least two conveyor lines comprises a straight line and at least another of the at least two conveyor lines comprises a curved line, wherein each of the at least two conveyor lines has a corresponding lateral distance out to a closest object that would impact a container pack being carried by that conveyor line and having a container pack width that exceeds that lateral distance;

by a control circuit, generating an optimal container pack size for each of a variety of different items to be transported within the distribution facility using the conveyor lines as an objective function based upon the corresponding lateral distance for each of the at least two conveyor lines and at least two of a holding cost, a distribution facility handling cost, and a downstream handling cost, such that the optimal container pack sizes for each of the variety of different items are optimized with respect to various associated costs and where the optimal container pack sizes are physically realistic in terms of handling capabilities of the conveyor lines of the distribution facility; and moving container packs that comply with the optimal container pack sizes via the conveyor lines to thereby ship the container packs to at least one downstream store.

2. The method of claim 1 wherein the at least two conveyor lines further include at least another conveyor line that comprises an inclined line.

3. The method of claim 1 wherein the at least two conveyor lines further include at least one gate, at least one inspection station, or at least one routing juncture.

4. The method of claim 1 wherein the optimal container pack size is for a cardboard container.

5. The method of claim 1 wherein the optimal container pack size for a given one of the variety of different items is for a container pack to contain a plurality of the given one of the variety of different items as shipped to the distribution facility by a manufacturer of the given one of the variety of different items.

6. The method of claim 1 wherein the optimal container pack size for a given one of the variety of different items is for a container pack to contain a plurality of the given one of the variety of different items as shipped to the distribution facility by a distributor of the given one of the variety of different items.

7. The method of claim 1 wherein:

each of the at least two conveyor lines has a corresponding vertical distance up to a closest object that would impact a container pack being carried by that conveyor line and having a container pack height that exceeds that vertical distance; and generating the optimal container pack size comprises generating the optimal container pack size for each of the variety of different items to be transported within the distribution facility using the conveyor lines as an objective function based upon the corresponding lateral distance for each of the at least two conveyor lines, the corresponding vertical distance for each of the at least two conveyor lines, and at least two of the holding cost, the distribution facility handling cost, and the downstream handling cost.

8. The method of claim 1 wherein generating the optimal container pack size comprises generating an optimal container pack size for each of the variety of different items to be transported within the distribution facility using the conveyor lines as an objective function based upon a weight-bearing capacity of the at least two conveyor lines, the corresponding lateral distance for each of the at least two conveyor lines, and at least two of the holding cost, the distribution facility handling cost, and the downstream handling cost.

9. The method of claim 1 wherein:

generating the optimal container pack size comprises generating the optimal container pack size for each of the variety of different items to be transported within the distribution facility using the conveyor lines as an objective function based upon the corresponding lateral distance for each of the at least two conveyor lines and each of a holding cost, a distribution facility handling cost, and a downstream handling cost.

10. The method of claim 9 wherein generating the optimal container pack size comprises generating the optimal container pack size for each of the variety of different items to be transported within the distribution facility using the conveyor lines as an objective function based upon the corresponding lateral distance for each of the at least two conveyor lines and each of a holding cost, a distribution facility handling cost, a downstream handling cost, a days-of-supply constraint, and a pack-and-a-half constraint.

* * * * *